United States Patent

Rickel

[15] 3,643,272

[45] Feb. 22, 1972

[54] WHEEL WASHER CONSTRUCTION

[72] Inventor: Allen D. Rickel, Northbrook, Ill.

[73] Assignee: Auto Laundry Equipment Sales Company, Glenview, Ill.

[22] Filed: June 2, 1969

[21] Appl. No.: 829,257

[52] U.S. Cl. ............................................................15/21 D
[51] Int. Cl. ..............................................................B60s 3/06
[58] Field of Search ......................15/DIG. 2, 21, 21 C, 21.3, 15/53, 302; 74/665 GB, 417

[56] References Cited

UNITED STATES PATENTS

| | | | |
|---|---|---|---|
| 2,716,772 | 9/1955 | Cockrell | 15/DIG. 2 |
| 2,822,564 | 2/1958 | Crivelli | 15/302 |
| 3,345,666 | 10/1967 | Hanna et al. | 15/21 C |
| 2,115,975 | 5/1938 | Harrold | 74/665 GB |

OTHER PUBLICATIONS

Auto Laundry News; Aug. 1968; page 51
Auto Laundry News; Nov. 1968; page 59

*Primary Examiner*—Edward L. Roberts
*Attorney*—Hume, Clement, Hume & Lee

[57] ABSTRACT

A wheel washer for use in automatic automobile laundries whereby an entire wheel, including the tire, of an automobile is washed and cleaned during one pass of the forwardly moving, rotating wheel. Staggered and stacked brush assemblies provide maximum surface cleaning of the automobile wheel in a minimum of linear travel distance. Direct chain-and-sprocket and geared driving means provide positive power delivery to the brush assemblies.

3 Claims, 2 Drawing Figures

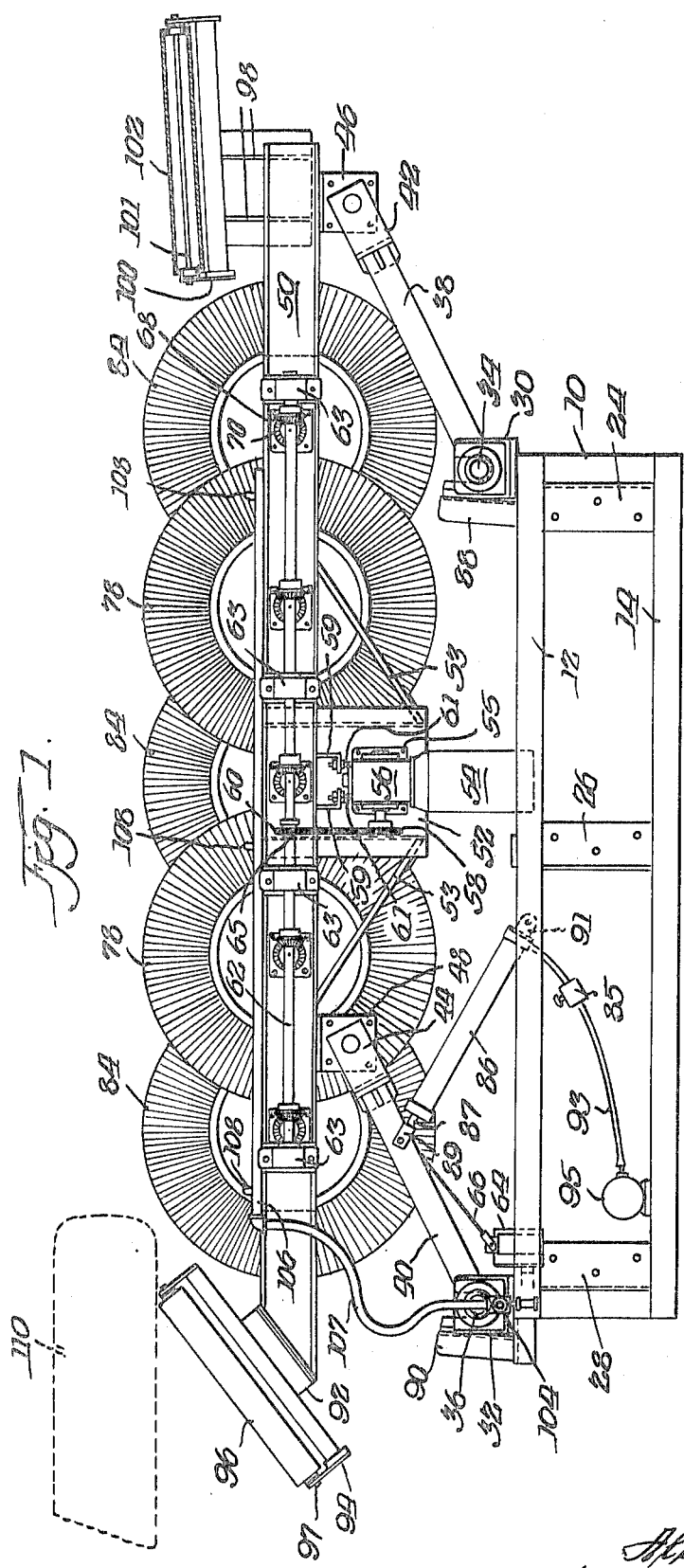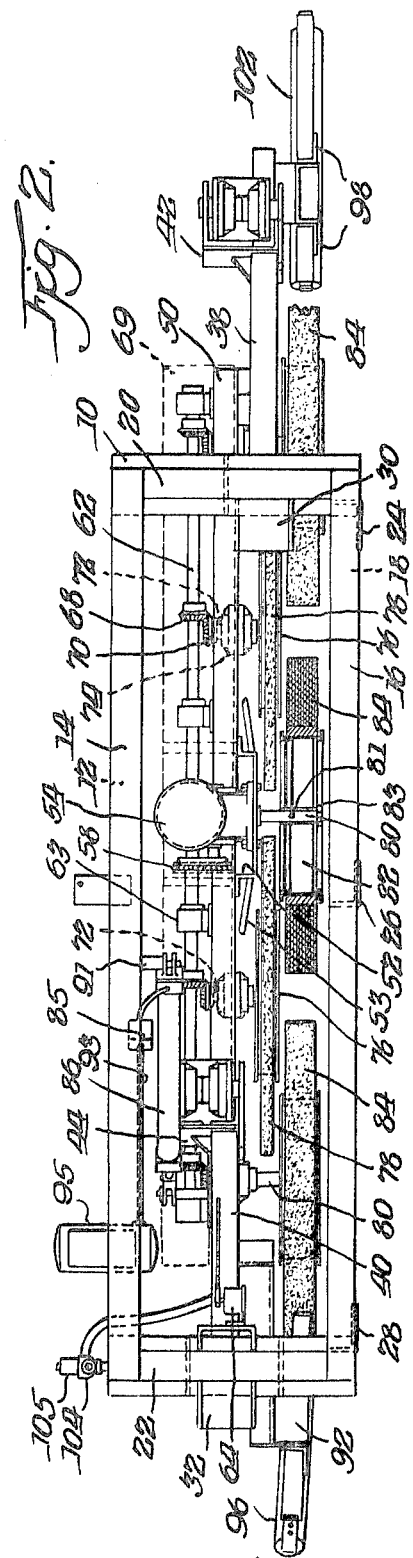

WHEEL WASHER CONSTRUCTION

This invention pertains to an improved device for use in automobile washing facilities to wash the wheels and tires of automobiles. Such devices are commonly referred to as "wheel washers." The type of system for which the invention is particularly suited includes a source of electrical energy to drive the power unit of the disclosed invention, plus a source of washing fluid, such as hot water, hot water-detergent mixture, or steam, which may be connected to and operated by the disclosed wheel washing device. The invention provides an automatic highly efficient, low-cost, positive action wheel washer which prevents portions of an automobile wheel and tire from being skipped during washing operations.

Present automatic wheel washing systems utilize single rotating brushes, on either stationary or movable axes, which do not have the ability to clean the entire wheel and tire of an automobile passing through an automatic automobile laundry without leaving a portion of the tire or wheel unwashed. The entire wheel and tire can be washed only by lengthening the linear contact dimension of the wheel with the washing device to the point of making said device impractical for use in modern auto laundries. Also, previous wheel washing devices have not been provided with positive drive mechanisms, thereby failing to insure constant rotation of the cleaning brushes against the forces of friction between the wheel and the brushes.

It is an object of the present invention to alleviate the foregoing problems in automatic automobile laundries by providing a wheel washer which is capable of cleaning the entire outward surface area of the automobile wheel and tire during one pass of a forwardly moving, rotating automobile wheel in a short linear distance.

It is a further object of the present invention to provide a wheel washer with brush assemblies in stacked and staggered positions relative to each other to insure complete washing of the wheel passing adjacent the wheel washer.

Another object of the present invention is to provide a direct, positive drive mechanism from a power source to the brush assemblies to insure that the forces of friction inherent in a washing operation of the type intended are overcome.

The wheel washer as herein described provides ease of maintenance and operation in that all moving parts operate through bearing means which are provided with adequate lubrication facilities. The brush assemblies may be easily removed and replaced when worn. All other parts which may in time show the effects of wear over prolonged useage may be replaced simply and effortlessly.

In the drawings:

FIG. 1 is a top view of the subject wheel washer in operative condition showing an automobile tire about to pass along the periphery of the brushes;

FIG. 2 is an elevation view of FIG. 1, showing in particular the horizontal and vertical relation of the brushes to each other.

Referring now to FIGS. 1 and 2 of the drawing, the wheel washer comprises a support frame generally designated 10, comprised of horizontally disposed square tubular members 12, 14, 16, 18 (not shown), and vertically disposed square tubular members 20, 22 (two each) located at each of the four corners of the support frame 10 to hold said support frame in a rectangular configuration. Baseplates 24, 26, and 28 are suitably attached to lower tubular members 16 and 18. Holes are provided in the horizontal portion of said base plates 24, 26, and 28 whereby said wheel washer can be suitably mounted to a floor or foundation.

L-shaped pivot brackets 30 and 32 are welded or otherwise suitably secured to support frame 10 as shown in FIG. 1. Pins 34, 36 are vertically disposed through holes in said pivot brackets 30 and 32. Pivot arms 38, 40 are mounted on pins 34, 36 respectively, and by means of suitable bearings, rotate relative to said pins 34, 36 and support frame 10. Pivot arms 38, 40 extend horizontally from support frame 10, and each terminates in a pivot plate portion 42, 44. Vertically disposed holes are provided in pivot plates 42, 44, whereby pivot pins extend therethrough and rotatably connect pivot arms 38, 40 to pivot brackets 46 and 48. Pivot brackets 46 and 48 are welded or otherwise suitably secured to drive frame 50, which is shown in FIG. 1 as an elongated U-shaped steel beam. Drive frame 50 extends horizontally and is supported above the floor or foundation by support frame 10 and pivot arms 38, 40.

Pivot arms 38 and 40 are mounted on pivot brackets 30 and 32 and pins 34 and 36 on a slight angle from the vertical, so that gravity causes frame 50 to normally swing outward and away from support frame 10 in the absence of any force compelling the drive frame 50 to move towards support frame 10. The operation of a vehicle wheel in forcing drive frame 50 inward will be explained hereinafter.

Mounted on drive frame 50 and integral therewith is motor mounting plate 52 which supports electric motor 54 and reduction gear unit 56. Brace members 53 assist in supporting mounting plate 52 on drive frame 50. Electric motor 54 is supported by and connected to reduction gear unit 56, which in turn is slidably attached to mounting plate 52 by means of bolts 55 passing through elongated slots in mounting plate 52. Brackets 59, attached to drive frame 50, comprise adjusting bolts 61 located therethrough which are movable horizontally and abut against the housing of gear reduction unit 56 for a purpose to be hereinafter described.

Electric motor 54, which may be of a type which supplies 2 horsepower at 1,750 r.p.m., drives toothed sprocket wheel 58 through gear reduction unit 56. A chain drive 65 provides power to a similar toothed sprocket wheel 60 affixed to line shaft 62, which is rotatably mounted on drive frame member 50 by suitable bearing means 63. Attached in spaced relation on line shaft 62, and rotatably therewith, are miter gear elements 68. Meshing with gears 68 at right angles thereto are miter gear elements 70 attached to a plurality of brush shafts 72 and 80. A gear splash cover 69 is provided over line shaft 62 and miter gears 68, 70 to insulate the drive mechanism from water and/or steam which is present in the area due to the washing operation. Brush shafts 72 are two in number and are relatively shorter than brush shafts 80, of which there are three in the disclosed embodiment. Brush shafts 72 and 80 are suitably mounted on, and pass through, drive frame 50 by means of suitable bearing members 74.

Removably connected by means of pins 81 to brush shafts 72 and 80 are brush holders 82. Mounted on the relatively longer brush shafts 80 are brush assemblies 84 comprising bristles made of paralax or other suitable material in the configuration of a wheel around a hollow center. The hollow center of each brush assembly is mounted on a brush holder 82. Nut and bolt assembly 83 permits the removal and replacement of one side of brush holder 82, enabling brush assemblies 84 to be readily mounted and removed when required.

Similarly connected to relatively shorter brush shafts 72 are brush holders 76, on which are mounted brush assemblies 78. Said brush assemblies 78 are smaller in width than brush assemblies 84, and are staggered to be rotated between and just above the plane of rotation of brush assemblies 84, as clearly shown in FIG. 2. For example, brush assemblies 78 may be on the order of 2 inches in width, while brush assemblies 84 may be 4 inches wide.

At either extremity of drive frame 50 are roller brackets 92 and 98 suitably affixed thereto. At the forward end of drive frame 50 (shown as the left end in FIGS. 1 and 2), a roller 96 is rotatably mounted in roller frame 94 attached to bracket 92. Roller 96 is comprised of tubular steel or other suitable material, and rotates about roller shaft 97. In a similar manner, roller 102, comprised of tubular steel or other similar material, is mounted by means of roller shaft 101 and roller frame 100 on roller brackets 98.

Mounted between pivot arm 40 and support frame 10 is a double-acting, free flowing, oil fed, shock cylinder assembly 86 comprising a piston shaft 87 movable therein and pivot mounting brackets 89 and 91 for mounting said shaft 87 and said cylinder assembly 86 to pivot arm 40 and support frame 10, respectively. Fluid conduit means 93 carries a viscous fluid such as oil from a fluid reservoir 95, suitably mounted on support frame 10, to cylinder assembly 86. Variable flow control valve means 85 are provided in conduit 93 to vary the rate of flow of fluid to and from cylinder assembly 86, as will be explained.

Mounted on support frame 10 at a point adjacent pivot bracket 32 is a waterproof limit switch 64. Limit switch 64 is controlled by a lever 66 which is biased into abutment with pivot arm 40. As pivot arm 40 moves towards support frame 10 about pivot pin 36, lever 66 similarly moves and causes limit switch 64 to move from an "off" position to an "on" position. Electrical input energy to limit switch 64 is transmitted by suitable connections (not shown) to electric motor 54 to energize and control said motor and the above described drive mechanism.

High-pressure valve means 104 are provided on support frame 10 for connection to a source of hot water, water and detergent mixture, or steam under pressure by means of flexible hosing or other suitable conduit means. Valve 104 is controlled by a solenoid actuator 105 (FIG. 2). Solenoid actuator 105 is operated by limit switch 64 simultaneously with the energization of electric motor 54, as will be described. The outlet of valve 104 is connected by a flexible hose or conduit 107 to one end of a pipe 106 which is suitably attached to drive frame 50 on a side away from support frame 10 (FIG. 1). Hollow pipe 106 comprises several outlet nozzles 108 in spaced relation, which nozzles are preferably made of stainless steel to prevent oxidation. As will be explained, a washing fluid such as hot water, a hot water-detergent mixture, or steam may be supplied to the inlet of valve means 104, which fluid is controllably transmitted through flexible hose 107 to pipe 106 and is dispensed on the wheel to be washed through outlet nozzles 108. Valve 104, flexible conduit 107 and nozzles 108 are preferably designed to permit the efficient flow of either hot water or steam at high or low pressures, depending on the type of wash fluid the individual operation desires to employ.

The operation of the present invention is as follows: support frame 10 is mounted on a floor or foundation in a facility suitable for the automatic cleaning and washing of automobiles. Support frame 10 is located at a point parallel to the direction of travel of an automobile through the washing system, and in such a position that drive frame 50, when fully extended on pivot arms 38 and 40, is approximately ahead of one of the front tires of an oncoming automobile. Two of the subject wheel washers are used in each washing facility; one on either side of the automobile so that all tires and wheels may be cleaned.

As the front wheel 110 of an automobile in the washing facility moves forward (from left to right in FIG. 1), it comes into contact with roller 96 and applies a force to drive frame 50. As previously described, pivot arms 38 and 40 are mounted on pins 34 and 36 on axes at a slight angle from the vertical, and the effects of gravity cause drive frame 50 to normally extend outward from support frame 10. The force applied to drive frame 50 as a result of the forward motion of wheel 110 causes pivot arms 38 and 40 to rotate on pins 34 and 36, thereby moving drive frame 50 towards support frame 10, and in a slightly forward direction. Drive frame 50, support frame 10 and pivot arms 38 and 40 constitute a kinetic parallelogram which maintains drive frame 50 in a parallel position relative to support frame 10 at all times.

As drive frame 50 is moved inwardly by tire 110, pivot arm 40 rotates in a clockwise direction (FIG. 1). Lever 66 which abuts pivot arm 40, is likewise rotated, and limit switch 64 is moved from its "off" to its "on" position. Electrical energy is transmitted through limit switch 64 to electric motor 54, which begins to drive line shaft 62 through gear reducer 56, sprocket wheel 58, chain 59, and sprocket wheel 60. Miter gears 68, 70, driven by line shaft 62, in turn drive brush shafts 72 and 80, thereby rotating brush assemblies 78 and 84. The outer periphery of brush assemblies 78 and 84 come into contact with the wheel 110 to be washed as the automobile moves forward through the washing facility.

At the same time that limit switch 64 energizes electric motor 54, it also causes solenoid actuator 105 to open valve 104 and permit a washing fluid such as hot water, a hot water-detergent mixture, or steam to pass from a suitable source, through flexible hose 107 and into pipe 106. Said washing fluid is then delivered to the surface of the tire and wheel to be washed through nozzles 108. Therefore, the rotating brushes "scrub" the wheel 110 with the washing fluid transmitted by nozzles 108 as said wheel moves in a forward direction.

As pivot arms 38 and 40 rotate about pins 34 and 36, movement is retarded or "damped" by the restraining action of oil-fed cylinder 86. As piston shaft 87 moves into cylinder 86, oil in cylinder 86 offers a retarding force and causes the entire mechanism associated with drive frame 50 to move inwardly at a rather slow pace. This prevents damage to the moving parts of the device, and maintains the brush assemblies 78 and 84 in an outward position for maximum contact with the wheel to be washed. Flow control valve 85 adjustably regulates the rate of flow of oil from cylinder 86 to oil reservoir 95 when piston shaft 87 is moved inwardly by pivot arm 40. By changing the rate of oil flow through flow control valve 85, the speed of movement of drive frame 50 and pivot arms 38 and 40 about pins 34 and 36 may be regulated.

As shown in FIGS. 1 and 2, the brush assemblies 78 and 84 are alternately spaced and in two horizontal planes. This arrangement permits the entire vertical surface area of the wheel 110 to be cleaned as it moves across the wheel washer. This arrangement also offers a definite advantage over the use of a single, movable brush in that the present invention permits the entire surface area of wheel 110 to be washed in one pass of the forwardly moving rotating wheel. Also, this result is accomplished in a shorter longitudinal space than would be required if only a single brush, or a nonstacked series of brushes, were used to achieve the same result.

As the wheel 110 moves forward, contact is ultimately made with roller 102, which holds the drive frame 50 in its inwardmost position until said wheel passes beyond the wheel washer. This prevents brush assemblies 78 and 84 and drive frame 50 from advancing under the rocker panel of the automobile.

The longitudinal spacing between rollers 96 and 102 may be adjusted so that when wheels on cars of normal wheel base are being washed, the rear tire of the forwardly moving automobile contacts roller 96 before the front tire completely leaves contact with roller 102. Such adjustment will prevent unnecessary movement of the device during washing of the wheels of a single vehicle. As the rear wheel of an automobile passes across roller 96, brush assemblies 78 and 84, and roller 102, the same operation as described above viz-a-viz the front wheel is repeated.

After a rear wheel has been washed and moves beyond contact with roller 102, pivot arms 38 and 40 move counterclockwise (as shown in FIG. 1) under the force of gravity, causing drive frame 50 and brush assemblies 78 and 84 to move outward away from support frame 10. Stop means 88 and 90 are provided on support frame 10 adjacent pivot brackets 30 and 32 to limit the outward rotative movement of pivot arms 38 and 40.

As drive frame 50 moves outwardly from support frame 10, the movement of pivot arm 40 and lever 66 causes limit switch 64 to be turned "off," thus deenergizing electric motor 54. Simultaneously, solenoid 105 closes valve 104 preventing the further flow of washing fluid to pipe 106 and nozzles 108. The speed of outward movement of drive frame 50 is determined by the rate at which oil from reservoir 95 flows through valve 85 and conduit 93 to replace the vacuum created in cylinder 86 by the outward movement of piston shaft 87.

The sprocket and chain drive 58, 59, and 60 which forms a direct drive connection between electric motor 54 and line shaft 62 may be adjusted to maintain the chain in a taut condition for maximum efficiency. Threaded bolt assemblies 61 are provided in two bracket members 59 which are attached to motor mounting plate 52. One end of each bolt assembly abuts the housing of gear reduction unit 56, which is affixed to motor mounting plate 52 by means of bolts 55 passing through elongated slots. To tighten chain 59, bolts 61 are rotated such that the housing of gear reduction unit 56 is moved in a direction away from drive frame 50 until the proper degree of tautness is achieved. Said housing is then tightly secured to motor mounting plate 52 by means of bolts 55. This provides a tight, adjustable, direct drive to line shaft 62 and brush assemblies 78 and 84 from electric motor 54.

It will be apparent that certain modifications may be made within the scope of the appended claims without departing from the spirit of the invention.

I claim:

1. A wheel washer comprising:

a first frame;

a second frame pivotally connected to said first frame;

first horizontally spaced brush means rotatably mounted in a first horizontal plane on said second frame;

second alternately spaced brush means rotatably mounted in a second horizontal plane on said second frame, vertically spaced from said first brush means;

and drive means including a source of power operably connected to rotatively drive said first and second brush means.

2. A wheel washer comprising:

a support frame;

a movable drive frame pivotally connected to said support frame for parallel movement with respect to said support frame;

drive shaft means rotatably mounted on said drive frame;

a source of power mounted on said drive frame and operatively connected to rotate said drive shaft means;

brush shaft means including a plurality of vertically disposed shafts rotatably mounted on said drive frame perpendicular to the axis of said drive shaft means and operably connected to be rotated by said drive shaft means;

first brush means removably affixed to certain of said brush shaft means and rotatable therewith in a first rotative plane;

second brush means removably affixed to the remainder of said brush shafts and rotatable therewith in a second rotative plane relative to said first rotative plane.

3. The wheel washer of claim 2 wherein:

said first brush means is of different dimensions than said second brush means.

* * * * *